G. MIZENER.
SAFETY VALVE FOR PNEUMATIC TIRES.
APPLICATION FILED JULY 11, 1914.
1,172,477. Patented Feb. 22, 1916.
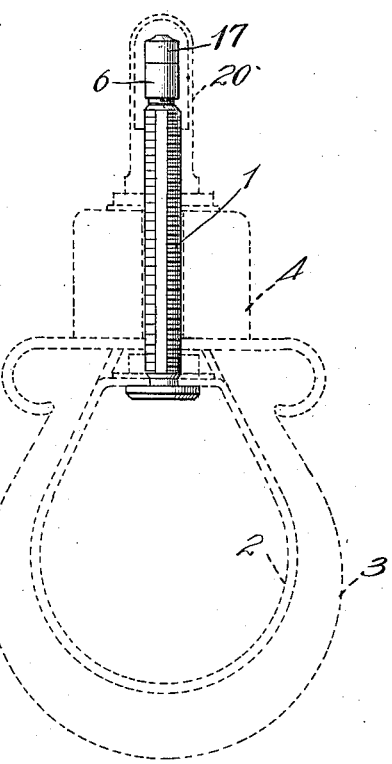
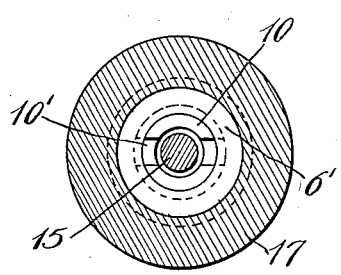
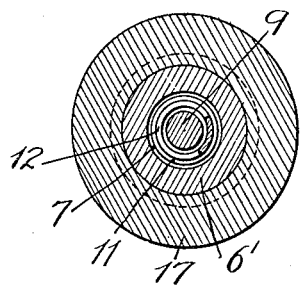
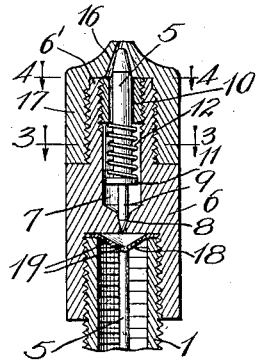
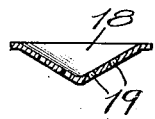
Inventor:
George Mizener,

UNITED STATES PATENT OFFICE.

GEORGE MIZENER, OF DECORAH, IOWA.

SAFETY-VALVE FOR PNEUMATIC TIRES.

1,172,477. Specification of Letters Patent. Patented Feb. 22, 1916.

Application filed July 11, 1914. Serial No. 850,446.

*To all whom it may concern:*

Be it known that I, GEORGE MIZENER, a citizen of the United States, residing at Decorah, in the county of Winneshiek and State of Iowa, have invented certain new and useful Improvements in Safety-Valves for Pneumatic Tires, of which the following is a description.

My invention belongs to that general class of devices known as safety valves, and particularly a safety valve for use on automobile tires or the like, to automatically relieve the pressure when the same rises above a predetermined amount. As is well known, many automobile tire blow-outs are caused by excessive pressure in the tires caused by heating, the expansion of the air within the tire causing the pressure to be raised above the intended or desired pressure.

The invention has among its objects the production of a device of the kind described that is simple, compact, efficient and satisfactory, and that may be manufactured at comparatively small cost, and applied upon practically all of the valve stems now in use in automobile tires.

The invention has among its further objects the production of a device that, while the desired pressure may be maintained in the tire, the air contained therein will not be lost or leak out to any extent when the tire hits a high place in the road, as for example, a stone, crossing, etc.

To this end my invention consists in the novel construction, arrangement and combination of parts herein shown and described, and more particularly pointed out in the claims.

In the drawings, in which like characters indicate like or corresponding parts, Figure 1 is a view in elevation of my device attached to a valve stem, the tire rim and felly wheel and valve cap being shown in dotted lines; Fig. 2 is a sectional view of my improved device; Fig. 3 is a cross sectional view taken substantially on line 3—3 of Fig. 2; Fig. 4 is a sectional view taken on line 4—4 of Fig. 2, and Fig. 5 is an enlarged sectional view through the member 18.

Referring to the drawings, in which the preferred embodiment of my invention is shown, 1 represents the usual valve stem suitably secured to the inner tube 2, arranged with a casing 3, which is suitably secured to the wheel felly 4. It may be mentioned that the valve stem 1 in the usual construction contains a valve provided with a stem 5, which extends to proximate the open end of the valve stem, the valve opening when air is pumped in the tire. This is a common and well known construction, and I have not illustrated the same in detail, only the end of the stem 5 being shown.

Arranged on the end of the valve stem is a casing 6, which is preferably chambered as at 7, the same being extended at the end as at 6'. The casing is formed to be screwed upon the end of the valve stem 1, the chamber 7 communicating with the chamber or bore of the stem. I preferably provide within the chamber a valve seat 8, and a valve member 9 of the needle valve type, arranged to seat upon the valve seat 8. Arranged at the end of the extension 6' is an apertured plug 10. The valve stem 9 is extended as at 15 through the aperture in the plug 10, the aperture being sufficiently large to allow the escape of air past the valve end 15. The stem 9 is provided with a collar 11, or its equivalent, for the purpose, and a spring 12, or its equivalent, arranged between the collar 11 and the plug 10, the spring tending to normally maintain the valve 9 upon its seat 8. The tension of the spring may be varied by turning the plug 10 in one direction or the other, the same being provided with a slot 10', or the equivalent, as for example an extension, by which the same may be engaged. Arranged on the end of casing 6 is an apertured cap 17 having a valve seat 16 at the aperture opening upon which the end of stem 15 may seat and seal the aperture, if the valve is moved sufficiently to engage with the seat, as in the case of a sudden shock.

At the opposite end of the casing is arranged a member 18 adapted to engage the valve stem 5 and maintain its valve control thereby in open position. In the preferred construction shown I employ a cone-shaped member 18, having holes 19 therethrough. This member, when made as shown, is preferably of a material that will serve as a packing between the end of the stem 1 and the casing 6, copper being very satisfactory for the purpose. When the cone member is positioned as shown, and the casing 6 turned down in place, the member 18 opens the valve control by stem 5, and at the same time prevents the escape of air between the casing and stem.

In using the device, the usual tip or cap arranged directly at the end of the stem is removed and my device screwed upon the end of the stem in its place. As the casing is screwed down, the valve controlled by stem 5 is opened and maintained in open position. Any escape of air, however, from the tire is prevented by the valve 9, which is maintained upon its seat by the spring or its equivalent 12. The pressure of the spring is made as desired in the manner previously described, to-wit, by adjusting the position of the plug 10. Should the pressure in the tire go beyond or rise above the predetermined pressure for which the valve is set the same will open the valve and escape past the valve and stem 15, and out through the aperture in part 17. As soon as the pressure drops, the valve returns to normal position. When the machine is traveling on the road in the case of striking an obstruction, if it is enough to temporarily raise the pressure in the tire above the point for which the valve is set, the valve 9 will be suddenly opened, but at the same time the outer end provided with the valve will seat upon the valve seat 16 in the cap part 17, preventing any considerable escape of air. In fact, the escape will be practically nothing. It will be noted by referring to Fig. 1, that the usual cap 20 may be positioned on the valve stem and inclose my device in the usual manner. The cap 20 may be provided with an aperture for the escape of air, if so desired, but ordinarily this is unnecessary as the air may escape between the flat side on the stem 1 and the cap, the valve stems being ordinarily made flat on one or both sides.

Having thus described my invention, it is obvious that various new and useful modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. In a device of the kind described and in combination, a casing member provided with a chamber therein, with an opening therefrom at each end, a valve member common to both openings and arranged to close either one of said openings, and adjustable means for resiliently maintaining said valve member at one opening in position to normally close the opening.

2. In a device of the kind described and in combination, a casing member provided with a chamber therein, with an opening therefrom at each end, a single integrally formed valve member arranged at its ends to close either one of said openings, and adjustable means for resiliently maintaining said valve member upon its seat at one opening.

3. A safety valve for pneumatic tires, comprising a casing member arranged for attachment on the end of the tire valve stem, and provided with an aperture extending therethrough, said casing provided with a valve seat at said aperture, a valve member positioned in said casing, and arranged to normally seat on said valve seat, and adjustable means for normally maintaining said valve member upon its seat, said casing provided with a cap having an opening therethrough in alinement with the aperture in the casing and formed with a valve seat on the inner side thereat, said valve member arranged at one end to coöperate with said valve seat and close said opening after predetermined movement of the valve member.

4. A safety valve for pneumatic tires, comprising the combination of a casing member having a chamber therein at one end, and arranged at the opposite end to embrace the tire valve stem, said casing provided with an inlet aperture extending from said chamber to the tire end thereof and with an outlet, a valve member arranged in said chamber and movable to close the inlet aperture or outlet, and means for normally maintaining said valve member in position to close said inlet aperture.

5. A safety valve for pneumatic tires, comprising the combination of a casing member having a chamber therein at one end, and arranged at the opposite end to embrace the tire valve stem, said casing provided with an aperture extending from said chamber to the tire end thereof, a valve member arranged in said chamber and having both ends thereof tapered, means for normally maintaining said valve member in position to close said aperture, and a detachable cap arranged over the end of said casing, and provided with an outlet for said chamber, said valve arranged to close said cap outlet upon a predetermined movement of the valve toward the cap.

6. In a device of the kind described and in combination, a casing member provided with a recess at each end, and having an opening therethrough connecting said recesses, a detachable apertured plug arranged in the recess at one end of said casing, a valve member arranged in said recess and extending through the aperture in said plug, said valve member arranged at one end to normally close the opening through the casing connecting said recesses, a cap arranged over the end of said casing and plug, said cap provided with an opening therethrough, said valve arranged at its other end to close the said opening in said cap upon a predetermined movement of the valve.

7. In a device of the kind described and in combination, a chambered casing having a recess at one end, and threaded on the interior thereof, an opening connecting the chamber in the casing and said recess, said casing arranged with a valve seat at the end of said opening at the chamber end, a detachable plug arranged at the outer end of said chamber, said plug provided with an opening therethrough, a cap arranged over the end of said casing and plug, said cap having an opening therethrough in alinement with the opening through the casing, and formed with a valve seat thereat on the inner side thereof, a valve member arranged to co-act with either of said valve seats, and means for normally maintaining said velve member on the valve seat at the opening through said casing.

8. A safety valve for pneumatic tires, comprising the combination of a chambered casing member, said member provided with a recess at one end and having an opening connecting said recess and the chamber in said casing with the valve seat at the chamber end of the opening, said casing internally threaded at said recess for engagement with the valve stem of a tire, and provided with means therein for maintaining the tire valve open, a cap arranged on the opposite end of said casing, and having an opening therethrough, provided with a valve seat on the inner side thereof, a valve member of slightly less length than the distance between the valve seats in said casing and cap, and arranged to seat upon either of said valve seats, and means for normally maintaining said valve member on the valve seat in the casing within said chamber.

In testimony whereof, I have hereunto signed my name in the presence of two subscribing witnesses.

GEORGE MIZENER.

Witnesses:
B. J. McKay,
E. E. Clatsenberg.